Sept. 9, 1930.  W. H. LINK  1,775,250
FLOWER HOLDER
Filed Nov. 14, 1927

INVENTOR.
WILLIAM H. LINK
BY A.B.Bowman
ATTORNEY

Patented Sept. 9, 1930

1,775,250

UNITED STATES PATENT OFFICE

WILLIAM H. LINK, OF SAN DIEGO, CALIFORNIA

FLOWER HOLDER

Application filed November 14, 1927. Serial No. 233,005.

My invention relates to flower holders and the objects of my invention are; first, to provide a flower holder that will accommodate a large number of flower stems and support them in symmetrically sprayed formation; second, to provide a flower holder of this class provided with an upper and lower supporting plate of substantially cupped shape which is adapted to be supported in raised position within the bowl or receptacle in which it is placed; third, to provide a flower holder of this class in which the upper plate is supported at its center in spaced relation from the lower plate while the lower plate is supported on legs extending from the periphery thereof so that a stable device is obtained; fourth, to provide a holder of this class which allows free circulation of the water around and over the plate and flower stems supported thereon; and fifth, to provide a device of this class which is easily cleaned, economical of construction, durable and which will not readily deteriorate or get out of order.

Figure 1:
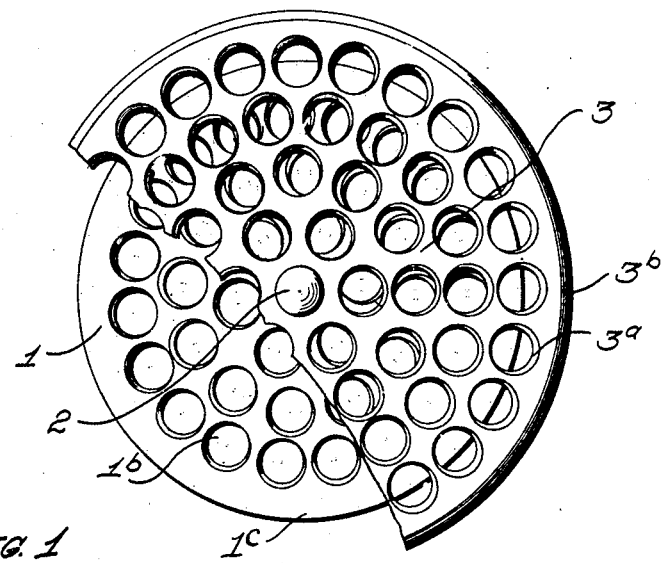
Figure 2:
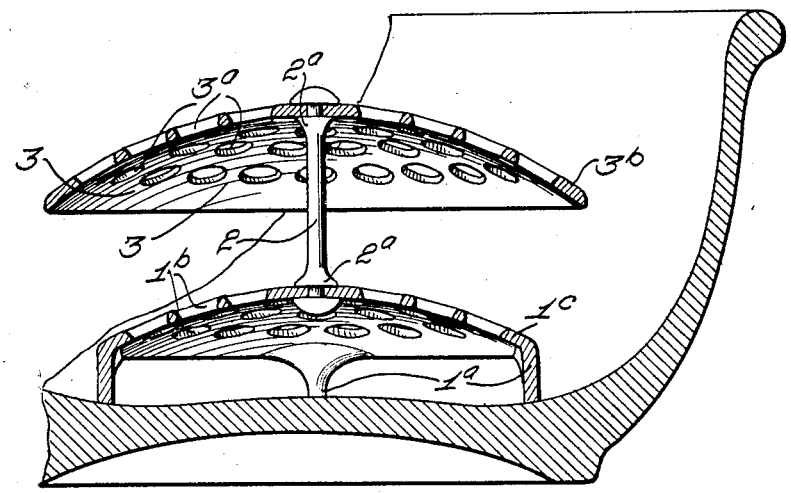

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application, in which:

Figure 1 is a plan view of my flower holder showing the upper supporting plate partly broken away in order to facilitate the view of the lower plate; and Fig. 2 is a vertical sectional view of my flower holder showing a fragmentary view of the flower bowl in which the holder is supported.

Similar characters of reference refer to similar parts and portions throughout the several views of the drawings.

My flower holder comprises the lower plate 1, the column or spindle 2 and the upper plate 3.

The plates 1 and 3 are made preferably of metal and are painted and are provided with a plurality of circular perforations $1^b$ and $3^a$ which are preferably centered on concentric circles around the center of the plates 1 and 3. The lower plate 1 which is preferably of circular form is of slightly cupped or curved form, the convex surface facing upwardly. The outer row of perforations in this plate are faced inwardly sufficiently to provide a rim $1^c$. From this rim extend a number of short legs $1^a$ which are adapted to support the plate 1 above the vessel in which the flower holder is placed. The supporting column or spindle 2 is secured to the center of the plate 1 in any desired manner and supports at its upper end the upper plate 3 in rigid parallel spaced relation with the plate 1. The plate 3 is of preferably a larger diameter than the plate 1 and is also slightly cupped, the convex surface facing upwardly and the outer margin of plate 3 overhangs that of plate 1. The column 2 may be provided with shoulders $2^a$ at its upward and lower ends providing a somewhat enlarged seating for the plate and enabling said plate to be rigidly secured to the column. Owing to the larger diameter of the plate 3 the outer row of perforations in this plate are centered on a considerably larger diameter than the outer row of perforations in the plate 1, hence in passing a flower stem through corresponding holes in the outer rows of the plates 1 and 3 the flower stem will be inclined at an angle to the column 2 and it is thereby possible to support a plurality of flowers in a natural outwardly sprayed formation. In providing a single central support for the upper plate 3 I provide an entirely unobstructed space between the upper and lower plates which greatly facilitates the placing of flower stems in the proper position. At the same time the entire weight of the upper plate and stems is supported at the center of the lower plate which results in a very stable device and which prevents it from being easily tipped over. The plate 3 is provided at its outer edge with a narrow non-perforated rim $3^b$. A further advantage of this construction is the ready access of the upper end lower surfaces for cleaning the holder when required.

Although I have shown and described a flower holder having circular upper and lower plates it is obvious that the form may be varied and the relative dimensions and spacings of the upper and lower plates varied without departing from the spirit of the invention.

It is obvious from the construction as illustrated in the drawings and described in the foregoing specification that there is provided a device as aimed at and set forth in the objects of the invention and though I have shown and described a particular construction, combination and arrangement of parts and portions, I do not wish to be limited to this particular construction, combination and arrangement but desire to include in the scope of my invention the construction, combination and arrangement substantially as set forth in the appended claims.

Having thus described my invention, what I claim as new and desire to secure by Letters Patent is:

1. In a flower holder, a pair of separate spaced apart circular convex plates, each perforated throughout its whole area except a rim at its outer edge, and a single central supporting spindle member secured between said plates for holding said plates in spaced apart relation.

2. In a flower holder, a lower perforated circular convex plate, and an upper circular convex perforated plate, said upper plate being supported on said lower plate by a single central spindle supporting member.

3. In a flower holder, a lower circular, convex plate fully perforated except at its outer edge, leg means at the periphery for supporting said perforated plate in raised position, an upper circular, convex plate fully perforated except at its outer edge, and a separate spindle means for supporting said upper perforated plate in parallel spaced relation from said lower plate.

4. In a flower holder, a lower curved plate fully perforated except at its outer edge, a second curved plate fully perforated except at its outer edge and a central supporting spindle member for rigidly supporting said second plate above said first plate in spaced relation therefrom.

5. In a flower holder, a lower circular convex plate perforated except at its outer edge, leg means extending downwardly at the periphery for supporting said plate in raised position, a second circular convex plate fully perforated except at its outer edge of larger diameter than said first mentioned plate, and a central spacing spindle member supported on said lower plate, said upper plate being secured to the upper end of said supporting member in substantially parallel spaced relation from said lower plate.

6. In a flower holder, a lower circular perforated plate provided with depending integral supporting means at its periphery, an upper convex perforated plate, and a central spindle connecting said plates and holding them in spaced apart relation.

In testimony whereof, I have hereunto set my hand at San Diego, California, this 5th day of November, 1927.

WILLIAM H. LINK.